(12) United States Patent
Ide

(10) Patent No.: US 11,196,084 B2
(45) Date of Patent: Dec. 7, 2021

(54) SOLID ELECTROLYTE AND FLUORIDE ION BATTERY

(71) Applicant: TOYOTA JIDOSHA KABUSHIKI KAISHA, Toyota (JP)

(72) Inventor: Kazuto Ide, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 16/718,550

(22) Filed: Dec. 18, 2019

(65) Prior Publication Data
US 2020/0203761 A1 Jun. 25, 2020

(30) Foreign Application Priority Data

Dec. 25, 2018 (JP) .............................. JP2018-240814

(51) Int. Cl.
H01M 4/02 (2006.01)
H01M 10/0562 (2010.01)
C01F 17/36 (2020.01)

(52) U.S. Cl.
CPC ......... H01M 10/0562 (2013.01); C01F 17/36 (2020.01); C01P 2002/30 (2013.01); C01P 2002/72 (2013.01); C01P 2006/40 (2013.01); H01M 2300/008 (2013.01)

(58) Field of Classification Search
CPC .................................................... H01M 4/02
See application file for complete search history.

(56) References Cited

U.S. PATENT DOCUMENTS

2018/0090790 A1* 3/2018 Nakatsutsumi ...... C01G 45/006
2018/0131037 A1 5/2018 Miki
2018/0151912 A1 5/2018 Ide

FOREIGN PATENT DOCUMENTS

JP 2018-077992 A 5/2018
JP 2018-092894 A 6/2018

OTHER PUBLICATIONS

Carine Rongeat et al., "Solid Electrolytes for Fluoride Ion Batteries: Ionic Conductivity in Polycrystalline Tysonite-Type Fluorides", ACS Applied Materials & Interfaces 2014, 6, pp. 2103-2110.
M. A. Reddy et al., "Batteries based on fluoride shuttle", Journal of Materials Chemistry 2011, 21, pp. 17059-17062.
N. I. Sorokin et al., "Optimization of Single Crystals of Solid Electrolytes with Tysonite-Type Structure (Laf3) for Conductivity at 293 K: 2. Nonstoichiometric Phases $R_{1-y}M_yF_{3-y}$ (R=La—Lu, Y; M=Sr, Ba)", Crystallography Reports vol. 60, No. 1, 2015, pp. 123-129.
S. Adams et al., "High power lithium ion battery materials by computational design", Phys. Status Solidi A, 208, No. 8, pp. 1746-1753 (2011).
W. D. Richards et al., "Interface Stability in Solid-State Batteries", Chemistry of Materials, 28,266(2016).

* cited by examiner

Primary Examiner — Jacob B Marks
(74) Attorney, Agent, or Firm — Sughrue Mion, PLLC

(57) ABSTRACT

A main object of the present disclosure is to provide a solid electrolyte with high fluoride ion conductivity. The present disclosure achieves the object by providing a solid electrolyte to be used for a fluoride ion battery, the solid electrolyte comprising: a composition of $Ce_{1-x-y}La_xSr_yF_{3-y}$, in which $0<x$, $0<y$, and $0<x+y<1$; and a crystal phase that has a Tysonite structure.

4 Claims, 4 Drawing Sheets

SOLID ELECTROLYTE AND FLUORIDE ION BATTERY

TECHNICAL FIELD

The present disclosure relates to a solid electrolyte with high fluoride ion conductivity.

BACKGROUND ART

As high-voltage and high-energy density batteries, for example, Li ion batteries are known. The Li ion battery is a cation-based battery utilizing a reaction between a Li ion and a cathode active material and a reaction between a Li ion and an anode active material. Meanwhile, as anion-based batteries, fluoride ion batteries utilizing the reaction of fluoride ions are known.

Solid electrolytes used in fluoride ion batteries are known and solid electrolytes having a Tysonite structure are disclosed in Patent Literatures 1 to 2 and Non-Patent Literatures 1 to 3. For example, Non-Patent Literature 1 discloses that $La_{1-y}Ba_yF_{3-y}$ ($0 \leq y \leq 0.15$) having a Tysonite structure has fluoride ion conductivity.

CITATION LIST

Patent Literatures

Patent Literature 1: Japanese Patent Application Laid-Open (JP-A) No. 2018-077992
Patent Literature 2: JP-A No. 2018-092894

Non-Patent Literatures

Non-Patent Literature 1: Carine Rongeat et al., "Solid Electrolytes for Fluoride Ion Batteries: Ionic Conductivity in Polycrystalline Tysonite-Type Fluorides", ACS Appl. Mater. Interfaces 2014, 6, 2103-2110
Non-Patent Literature 2: M. A. Reddy et al, "Batteries based on fluoride shuttle", Journal of Material Chemistry 2011, 21, 17059-17062
Non-Patent Literature 3: N. I. Sorokin et al, "Optimization of Single Crystals of Solid Electrolytes with Tysonite-Type Structure (LaF3) for Conductivity at 293K:2. Non-stoichiometric Phases R1-yMyF3-y (R=La—Lu, Y; M=Sr, Ba)", Crystallography Reports 2015, 60, 123-129

SUMMARY OF DISCLOSURE

Technical Problem

From the view point of improving the performance of a fluoride ion battery, there is a need for a solid electrolyte with high fluoride ion conductivity. The present disclosure has been made in view of the above circumstances, and a main object thereof is to provide a solid electrolyte with high fluoride ion conductivity.

Solution to Problem

In order to achieve the object, the present disclosure provides a solid electrolyte to be used for a fluoride ion battery, the solid electrolyte comprising: a composition of $Ce_{1-x-y}La_xSr_yF_{3-y}$, in which $0<x$, $0<y$, and $0<x+y<1$; and a crystal phase that has a Tysonite structure.

According to the present disclosure, inclusion of the specific composition and crystal phase allows a solid electrolyte to have high fluoride ion conductivity.

In the disclosure, the x may satisfy $0.06 \leq x \leq 0.33$.

Also, the present disclosure provides a fluoride ion battery comprising: a cathode layer, an anode layer, and a solid electrolyte layer formed between the cathode layer and the anode layer; wherein at least one of the cathode layer, the anode layer, and the solid electrolyte layer contains the above described solid electrolyte.

According to the present disclosure, at least one of the cathode layer, the anode layer, and the solid electrolyte layer contains the above described solid electrolyte, so as to allow a fluoride ion battery to have, for example, high output.

Advantageous Effects of Disclosure

The present disclosure exhibits effects such that the solid electrolyte with high fluoride ion conductivity may be obtained.

DESCRIPTION OF EMBODIMENTS

Figure 1:
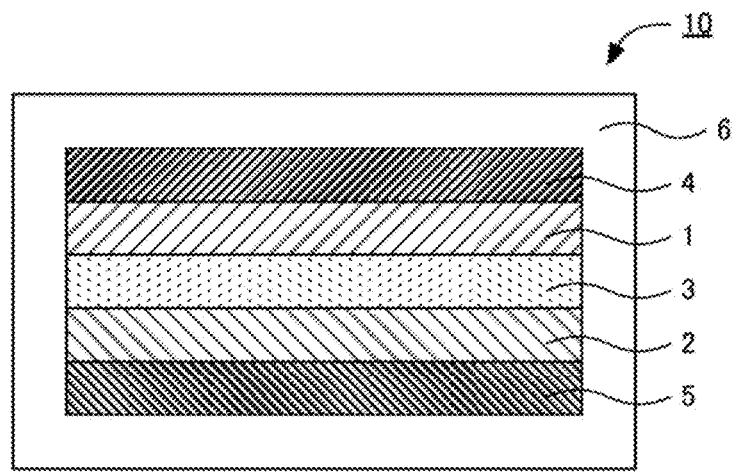
FIG. 1 is a schematic cross-sectional view illustrating an example of the fluoride ion battery in the present disclosure.

The solid electrolyte and the fluoride ion battery in the present disclosure are hereinafter described in detail.

A. Solid Electrolyte

The solid electrolyte in the present disclosure is a solid electrolyte to be used for a fluoride ion battery, the solid electrolyte comprising: a composition of $Ce_{1-x-y}La_xSr_yF_{3-y}$, in which $0<x$, $0<y$, and $0<x+y<1$; and a crystal phase that has a Tysonite structure.

According to the present disclosure, inclusion of the specific composition and crystal phase allows a solid electrolyte to have high fluoride ion conductivity. Also, since the solid electrolyte has an element of which reduction resistance is high, it may exhibit high reduction resistance. Further, this solid electrolyte may be used, even at a room temperature, as a solid electrolyte as well as a self-forming anode.

Here, Non-Patent Literature 3 discloses that the solid electrolyte having a composition of $La_{0.95}Sr_{0.05}F_{2.95}$ or a composition of $Ce_{0.95}Sr_{0.05}F_{2.95}$ exhibits high fluoride ion conductivity, which is on $10^{-4}$ S/cm. However, the solid electrolyte disclosed in Non-Patent Literature 3 is in a single crystal state; thus it is difficult to apply that as it is to a battery. In a battery, a solid electrolyte is usually used as a compressed powder body, and fluoride ion conduction in particle/particle interface is necessary in the compressed powder body; thus, the conductivity is generally degraded compared with that in the single crystal state. In contrast, as shown in Examples described later, the solid electrolyte in the present disclosure exhibits high fluoride ion conductivity of $10^{-5}$ S/cm or higher at a room temperature even in a state of compression powder molded body.

The solid electrolyte in the present disclosure has a composition of $Ce_{1-x-y}La_xSr_yF_{3-y}$, in which $0<x$, $0<y$, and $0<x+y<1$. Here, "$Ce_{1-x-y}La_xSr_yF_{3-y}$, in which $0<x$, $0<y$, and $0<x+y<1$" means both of when the solid electrolyte includes just a Ce element, a La element, a Sr element, and a F element in the composition of $Ce_{1-x-y}La_xSr_yF_{3-y}$, in which $0<x$, $0<y$, and $0<x+y<1$, and when the solid electrolyte further includes an additional element thereto. In the latter case, the total proportion of the Ce element, the La element, the Sr element, and the F element to all the elements that configure the solid electrolyte is, preferably 90 mol % or more, and more preferably 95 mol % or more.

In the composition of $Ce_{1-x-y}La_xSr_yF_{3-y}$, the "x" is larger than 0, the "y" is larger than 0, and the "x+y" satisfies $0<x+y<1$. The "x" is, for example, 0.05 or more, may be 0.1 or more, may be 0.2 or more, and may be 0.3 or more. Meanwhile, the "x" is, for example, 0.8 or less, may be 0.6 or less, and may be 0.4 or less. Also, the "y" is, for example, 0.01 or more, may be 0.03 or more, and may be 0.05 or more. Meanwhile, the "y" is, for example, 0.5 or less, may be 0.3 or less, and may be 0.1 or less. Further, the "x+y" is, for example, 0.05 or more, and may be 0.1 or more. Meanwhile, the "x+y" is, for example, 0.6 or less, may be 0.4 or less, and may be 0.2 or less.

The solid electrolyte in the present disclosure has a crystal phase with a Tysonite structure. This crystal phase is a crystal phase that contains a Ce element, a La element, a Sr element, and a F element. Also, the space group of the crystal phase is usually P-3c1. The crystal phase preferably has peaks at the positions of $2\Theta=24.4°\pm0.5°$, $24.9°\pm0.5°$, $27.8°\pm0.5°$, $35.1°\pm0.5°$, $43.9°\pm0.5°$, $45.1°\pm0.5°$, $50.9°\pm0.5°$, and $52.8°\pm0.5°$ in an X-ray diffraction (XRD) measurement using a CuKα ray. Incidentally, these peak positions are in the range of $\pm0.5°$ since the crystal lattice may be slightly changed depending on factors such as the material composition. The range of each peak position may be $\pm0.3°$, and may be $\pm0.1°$.

The solid electrolyte in the present disclosure preferably has the crystal phase as a main phase. The proportion of the crystal phase (crystal phase with a Tysonite structure) relative to all the crystal phases in the solid electrolyte is, for example, 50 mol % or more, may be 70 mol % or more, and may be 90 mol % or more. In particular, the solid electrolyte of the present disclosure preferably has the crystal phase solely. The reason therefor is to allow the solid electrolyte to have high fluoride ion conductivity.

The solid electrolyte in the present disclosure preferably has high fluoride ion conductivity. The fluoride ion conductivity of the solid electrolyte at 25° C. is, for example, preferably $1\times10^{-5}$ S/cm or more. Also, there are no particular limitations on the shape of the solid electrolyte of the present disclosure, and examples thereof may include a granular shape and a thin film shape. The average particle size ($D_{50}$) of the solid electrolyte is, for example, preferably in a range of 0.1 μm to 50 μm. Also, the solid electrolyte of the present disclosure is used for a fluoride ion battery. The details of the fluoride ion battery will be described later.

Examples of the method for fabricating the solid electrolyte particle may include a ball milling treatment. The solid electrolyte particle may be fabricated by, for example, mixing the raw material powders by ball milling and baking the obtained mixture.

B. Fluoride Ion Battery

FIG. 1 is a schematic cross-sectional view illustrating an example of the fluoride ion battery in the present disclosure. Fluoride ion battery 10 shown in FIG. 1 comprises cathode layer 1, anode layer 2, solid electrolyte layer 3 formed between the cathode layer 1 and the anode layer 2, cathode current collector 4 for collecting currents of the cathode layer 1, anode current collector 5 for collecting currents of the anode layer 2, and battery case 6 for storing these members.

According to the present disclosure, at least one of the cathode layer, the anode layer, and the solid electrolyte layer contains the above described solid electrolyte, so as to allow a fluoride ion battery to have, for example, high output.

The fluoride ion battery in the present disclosure is hereinafter described in each constitution.

1. Solid Electrolyte Layer

The solid electrolyte layer in the present disclosure is a layer that contains at least a solid electrolyte. Also, the solid electrolyte layer may contain only the solid electrolyte, and may further contain a binder.

The solid electrolyte included in the solid electrolyte layer is not limited if the material has fluoride ion conductivity, but is preferably the material described in "A. Solid electrolyte" above. In other words, the solid electrolyte layer preferably contains the solid electrolyte described in "A. Solid electrolyte" above.

The binder is not limited if it is chemically and electronically stable, and examples thereof may include fluorine-based binders such as polyvinylidene fluoride (PVDF) and polytetra fluoroethylene (PTFE). Also, the thickness of the solid electrolyte layer greatly varies with the constitution of the battery, and thus is not limited.

2. Cathode Layer

The cathode layer in the present disclosure is a layer that contains at least a cathode active material. Also, the cathode layer may further contain at least one of a solid electrolyte, a conductive material, and a binder, other than the cathode active material. Also, the cathode layer preferably contains the solid electrolyte described in "A. Solid electrolyte" above.

The cathode active material in the present disclosure is usually an active material of which defluorination occurs during discharge. Examples of the cathode active material may include a simple substance of metal, an alloy, a metal oxide, and the fluorides of these. Examples of the metal element to be included in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Among them, the cathode active material is preferably Cu, $CuF_z$, Fe, $FeF_z$, Ag, and $AgF_z$. Incidentally, the "z" is a real number larger than 0. Also, additional examples of the cathode active material may include a carbon material and the fluoride thereof. Examples of the carbon material may include graphite, coke, and carbon nanotube. Also, further additional examples of the cathode active material may include a polymer material. Examples of the polymer material may include polyaniline, polypyrrole, polyacetylene, and polythiophene.

The conductive material is not limited if it has the desired electron conductivity, and examples thereof may include a carbon material. Examples of the carbon material may include carbon black such as acetylene black, Ketjen black, furnace black, and thermal black. On the other hand, the binder is not limited if it is chemically and electronically stable, and examples thereof may include fluorine-based binders such as polyvinylidene fluoride (PVDF) and polytetra fluoroethylene (PTFE). Also, the content of the cathode active material in the cathode layer is preferably larger from the viewpoint of the capacity. Also, the thickness of the cathode layer greatly varies with the constitution of the battery, and thus is not limited.

3. Anode Layer

The anode layer in the present disclosure is a layer that contains at least an anode active material. Also, the anode layer may further contain at least one of a conductive material and a binder other than the anode active material. Also, the anode layer preferably contains the solid electrolyte described in "A. Solid electrolyte" above.

The anode active material in the present disclosure is usually an active material of which fluorination occurs during discharge. Also, an arbitrary active material having lower potential than that of the cathode active material may be selected as the anode active material. Thus, the above described cathode active material may be used as the anode active material. Examples of the anode active material may include a simple substance of metal, an alloy, a metal oxide, and the fluoride of these. Examples of the metal element to be included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_q$, Al, $AlF_q$, Ce, $CeF_q$, Ca, $CaF_q$, Pb, and $PbF_q$. Incidentally, the "q" is a real number larger than 0. Also, the above described carbon materials and polymer materials may be used as the anode active material.

Regarding the conductive material and the binder, the same materials as those described for the above described cathode layer may be used. Also, the content of the anode active material in the anode layer is preferably larger from the viewpoint of the capacity. Also, the thickness of the anode layer greatly varies with the constitution of the battery, and thus is not limited.

Incidentally, when the solid electrolyte in the present disclosure is used in the above described solid electrolyte layer, it may form a fluoride ion battery without an anode layer. The reason therefor is that the defluorination of the solid electrolyte in the present disclosure occurs in the interface between the solid electrolyte layer and the anode current collector during the first charge to cause the reaction of generating an anode active material; thus, the anode active material layer is self-formed.

4. Other Constitutions

The fluoride ion battery in the present disclosure comprises at least the above described cathode layer, anode layer, and solid electrolyte layer, and usually further comprises a cathode current collector for collecting currents of the cathode layer, and an anode current collector for collecting currents of the anode layer. Examples of the shape of the current collectors may include a foil shape, a mesh shape, and a porous shape.

5. Fluoride Ion Battery

The fluoride ion battery in the present disclosure may be a primary battery and may be a secondary battery, but preferably a secondary battery among them, so as to be repeatedly charged and discharged and be useful as a car-mounted battery for example. Also, examples of the shape of the fluoride ion battery in the present disclosure may include a coin shape, a laminate shape, a cylindrical shape, and a square shape. Also, there are no particular limitations on the battery case to be used for the fluoride ion battery.

Incidentally, the present disclosure is not limited to the embodiments. The embodiments are exemplifications, and any other variations are intended to be included in the technical scope of the present disclosure if they have substantially the same constitution as the technical idea described in the claim of the present disclosure, and offer similar operation and effect thereto.

EXAMPLES

Example 1

Figure 2:
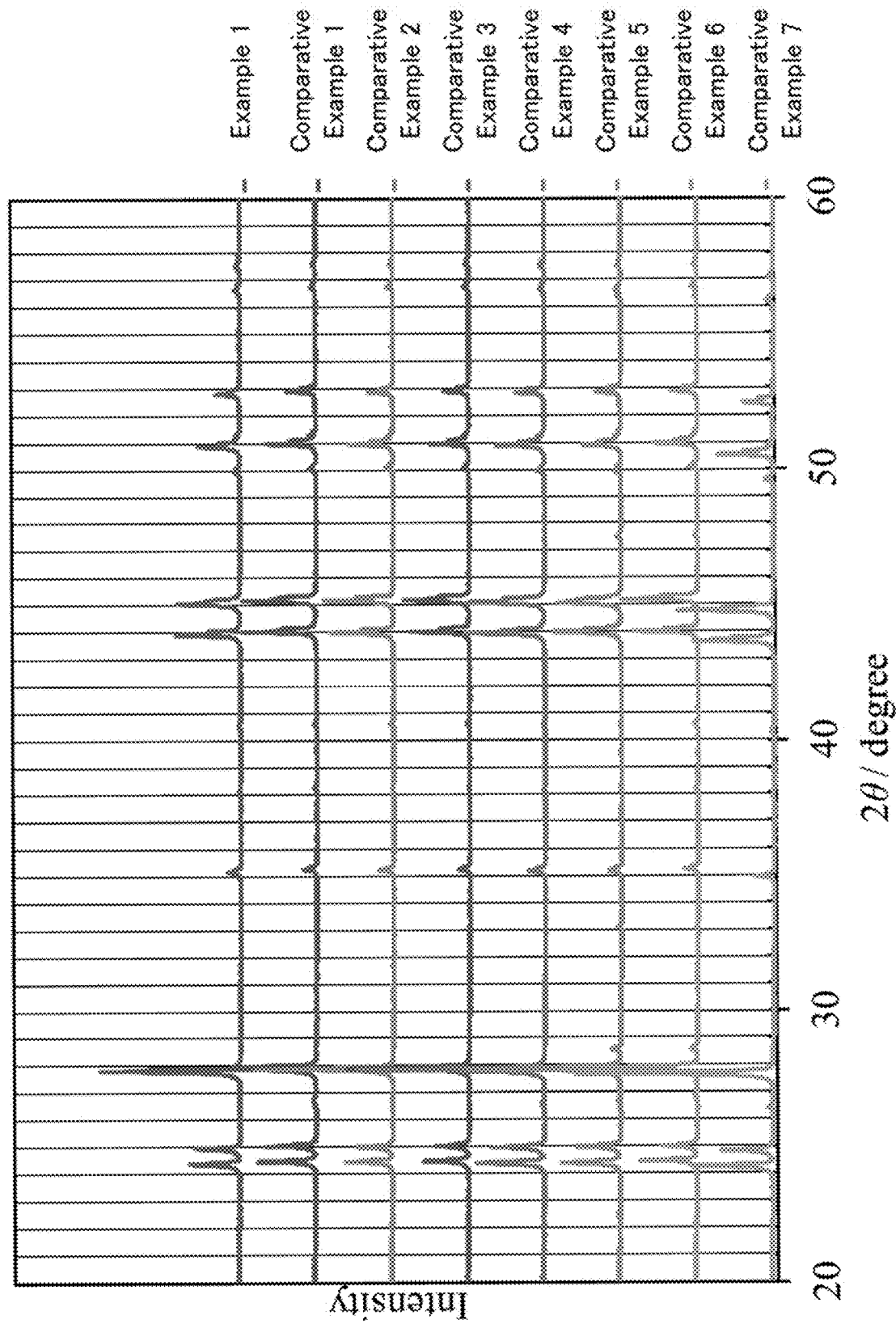
FIG. 2 is a graph showing the result of an XRD measurement for the solid electrolyte obtained in Example 1, and Comparative Examples 1 to 7.

Powder $CeF_3$, powder $LaF_3$, and powder $SrF_2$ were mixed in the molar ratio of $CeF_3:LaF_3:SrF_2=0.88:0.06:0.06$. Mechanical milling was conducted for the obtained mixture, in the conditions of using a planetary ball mill at the revolution number of 600 rpm for 12 hours. The powder after the mechanical milling was baked at 900° C. and thereby a solid electrolyte represented by $Ce_{0.88}La_{0.06}Sr_{0.06}F_{2.94}$ was obtained. This composition corresponds to x=0.06 and y=0.06 in $Ce_{1-x-y}La_xSr_yF_{3-y}$. Incidentally, as shown in FIG. 2, from the result of the XRD measurement, the obtained solid electrolyte had the crystal phase with Tysonite structure solely.

Examples 2 to 6

A solid electrolyte was obtained in the same manner as in Example 1, except that the "x" in $Ce_{1-x-y}La_xSr_yF_{3-y}$ was respectively changed to x=0.11, x=0.16, x=0.22, x=0.27, or x=0.33.

Comparative Examples 1 and 8

A solid electrolyte was obtained in the same manner as in Example 1, except that the composition was changed to those shown in Table 1.

Evaluation

Fluoride Ion Conductivity Measurement

A fluoride ion conductivity measurement by an alternating current impedance method was conducted for the solid electrolyte obtained in Examples 1 to 6 and Comparative Examples 1 to 8. Evaluation batteries were respectively prepared as follows. First, the solid electrolyte (powder) of 200 mg was put in a ceramic cylinder made of macole and uniaxial-pressure-molded at 1 ton/cm² so as to be molded in a pellet shape. After that, 5 mg of acetylene black as a current collector was stacked on one surface of the pellet, and a 100 μm thick Pb foil was pasted on the other surface, then pressed at the pressure of 4 ton/cm². The stacked body after pressing was confined with a bolt by torque of 6 N·m. Thereby, the evaluation batteries were respectively obtained.

Figure 3:
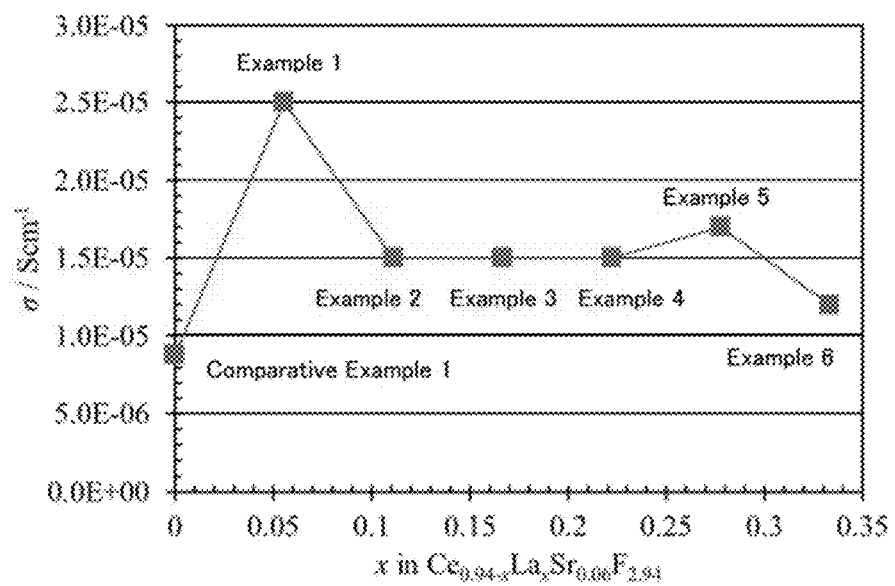
FIG. 3 is a graph showing the result of a fluoride ion conductivity measurement for the solid electrolyte obtained in Examples 1 to 6 and Comparative Example 1.

The measurement environment was under a vacuum of 1 Pa and at a room temperature (25° C.). Also, in the impedance measurement, the frequency was $10^6$ Hz to $10^{-2}$ Hz, and the voltage magnitude was 50 mV. The measurement results are shown in Table 1 and FIG. 3.

Cyclic Voltammetry Measurement

Figure 4:
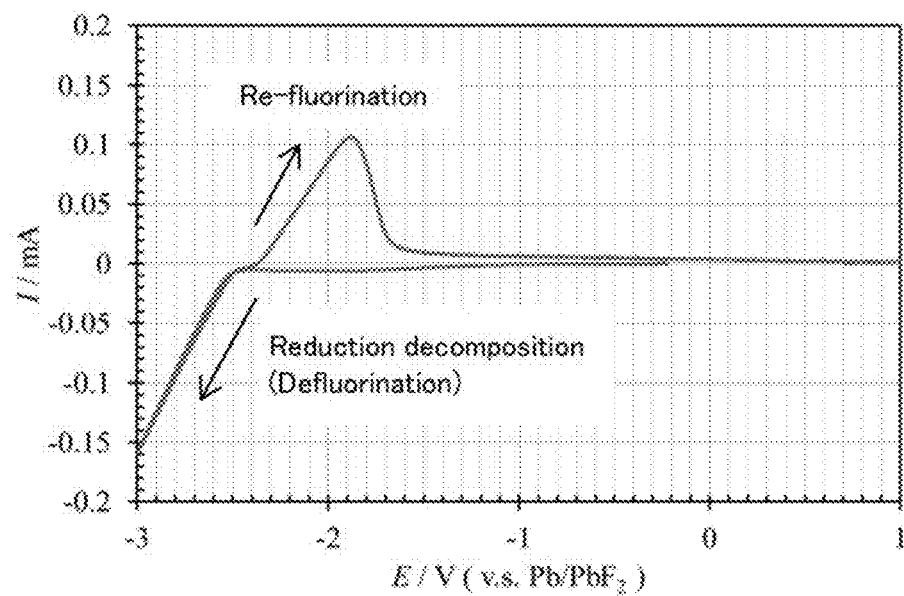
FIG. 4 is a graph showing the result of a cyclic voltammetry test for the solid electrolyte obtained in Example 1.

A cyclic voltammetry (CV) measurement was conducted for the evaluation battery using the solid electrolyte of Example 1. The measurement conditions were the sweeping speed of 1 mV/sec and the potential sweeping range of −0.5 to −3.0 V (vs. Pb/PbF$_2$). Incidentally, the measurement temperature was at a room temperature (25° C.). The result is shown in FIG. 4.

TABLE 1

| | Composition | Conductivity/Scm$^{-1}$ |
|---|---|---|
| Example 1 | Ce$_{0.88}$La$_{0.06}$Sr$_{0.06}$F$_{2.94}$ | 2.5 × 10$^{-5}$ |
| Example 2 | Ce$_{0.83}$La$_{0.11}$Sr$_{0.06}$F$_{2.94}$ | 1.5 × 10$^{-5}$ |
| Example 3 | Ce$_{0.78}$La$_{0.16}$Sr$_{0.06}$F$_{2.94}$ | 1.5 × 10$^{-5}$ |
| Example 4 | Ce$_{0.72}$La$_{0.22}$Sr$_{0.06}$F$_{2.94}$ | 1.5 × 10$^{-5}$ |
| Example 5 | Ce$_{0.67}$La$_{0.27}$Sr$_{0.06}$F$_{2.94}$ | 1.7 × 10$^{-5}$ |
| Example 6 | Ce$_{0.61}$La$_{0.33}$Sr$_{0.06}$F$_{2.94}$ | 1.2 × 10$^{-5}$ |
| Comparative Example 1 | Ce$_{0.94}$Sr$_{0.06}$F$_{2.94}$ | 8.8 × 10$^{-6}$ |
| Comparative Example 2 | Ce$_{0.99}$Sr$_{0.01}$F$_{2.99}$ | 2.3 × 10$^{-6}$ |
| Comparative Example 3 | Ce$_{0.97}$Sr$_{0.03}$F$_{2.97}$ | 6.8 × 10$^{-6}$ |
| Comparative Example 4 | Ce$_{0.93}$Sr$_{0.07}$F$_{2.93}$ | 8.1 × 10$^{-6}$ |
| Comparative Example 5 | Ce$_{0.9}$Sr$_{0.1}$F$_{2.9}$ | 2.4 × 10$^{-6}$ |
| Comparative Example 6 | CeF$_3$ | 1.4 × 10$^{-9}$ |
| Comparative Example 7 | La$_{0.94}$Sr$_{0.06}$F$_{2.94}$ | 6.2 × 10$^{-6}$ |
| Comparative Example 8 | La$_{0.9}$Ba$_{0.1}$F$_{2.9}$ | 1.0 × 10$^{-7}$ |

As shown in Table 1, with the solid electrolytes having ternary system of Ce, Sr, F (Comparative Examples 1 to 5) and the solid electrolyte having ternary system of La, Sr and F (Comparative Example 7) disclosed in Non-Patent Literature 3, the fluoride ion conductivity in the compressed powder state was approximately 10$^{-6}$ S/cm. Accordingly, it was confirmed that the fluoride ion conductivity (10$^{-4}$ S/cm) in the single crystal state described in Non-Patent Literature 3 drastically decreased in the compressed powder state used in a real battery. On the other hand, the solid electrolytes (Examples 1 to 6) in the present disclosure showed the conductivity of 10$^{-5}$ S/cm or more even in the state of compressed powder body.

Further, as disclosed in Non-Patent Literature 1, the compressed powder body of La$_{0.9}$Ba$_{0.1}$F$_{2.9}$ has been known as a compressed powder body of a solid electrolyte material having a Tysonite structure that exhibits high fluoride ion conductivity. However, Examples 1 to 6 showed about 100 times or more of conductivity than that of the Comparative Example 8, which was assumed to be the solid electrolyte in Non-Patent Literature 1.

In this manner, it was confirmed that the solid electrolyte in the present disclosure had a crystal phase having a Tysonite structure and the composition having the specific ratio of four elements Ce, La, Sr, and F, and thus had remarkably superior fluoride ion conductivity to that of the conventional solid electrolytes.

Further, as shown in FIG. 4, it was confirmed that the reduction decomposition of the solid electrolyte in the present disclosure did not occur until −2.4 V (vs. Pb/PbF$_2$), and showed high reduction resistance. It was also confirmed that this material was able to be used as both a solid electrolyte and a self-forming anode at a room temperature, since approximately 100 µA flowed at the peak in the oxidized side (re-fluorination reaction).

Reference Example

Figure 5:
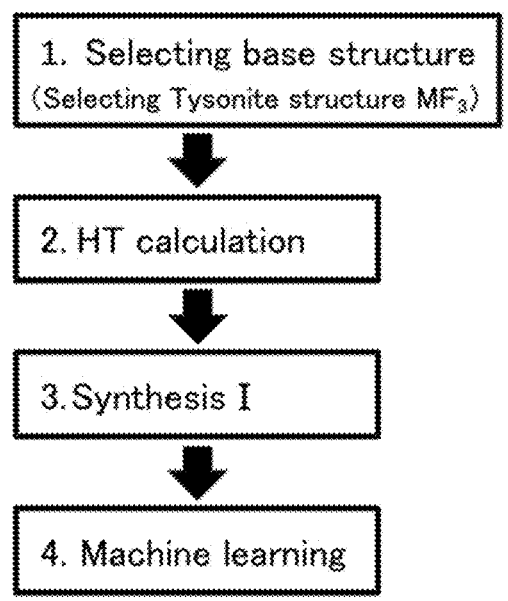
FIG. 5 is a flow chart for explaining a machine learning of Reference Example.

The ion conductivity of a solid electrolyte was predicted utilizing machine learning. FIG. 5 is a flow chart for explaining the machine learning. First, the inventor of the present application selected a Tysonite structure (MF$_3$) as a base structure of a high conductive body, which is also described in the references above (Selecting base structure). Next, the candidates of solid electrolytes were selected from high-throughput calculation (HT calculation). Next, the solid electrolytes were actually synthesized based on the selected candidates (Synthesis I). The conductivity of the synthesized solid electrolytes was respectively measured to produce the training data of the machine learning. The conductivity of the solid electrolyte was respectively predicted based on the produced training data (Machine learning).

In HT calculation, the crystal structures (3000 or more) of the elemental substitute of a Tysonite structure (LaF$_3$) were produced by simulation, all the calculated substitute structures were subjected to structural relaxation with density functional theory (DFT), and the stable structure and the total energy in that state was respectively calculated. Next, regarding each crystal structure produced in the simulation, decomposition energy was respectively calculated by a method described in W. D. Richards et al., Chem. Mater., 28, 266 (2016), and the activation energy of fluorine conduction was respectively calculated by the method described in S. Adams et al., Phys. Status Solidi A, 208, 1746 (2011). The structures having low decomposition energy and low activation energy was selected as the candidates to be synthesized in Synthesis I. Also, from these results, the crystal structure parameters to be used as the explanatory variables for the machine learning were calculated. Examples of the crystal structure parameter include items such as F-defect amount and F-F distance.

In Synthesis I, the selected candidates were actually synthesized and the conductivity thereof was measured (sample number: 30 or more). The training data of the machine learning was produced based on the obtained conductivity. In the machine learning, based on the training data, the relation between the actually measured conductivity and the crystal structure parameter was obtained from the regression analysis of the machine learning. The crystal structure parameter was assigned to the obtained regression formula, and the conductivity of the solid electrolyte was respectively predicted. The predicted values for the solid electrolytes obtained in Examples 1 to 6 are shown in Table 2.

TABLE 2

| | Composition | (Predicted value) Conductivity/Scm$^{-1}$ | (Test result) Conductivity/Scm$^{-1}$ |
|---|---|---|---|
| Example 1 | Ce$_{0.88}$La$_{0.06}$Sr$_{0.06}$F$_{2.94}$ | 2.2 × 10$^{-5}$ | 2.5 × 10$^{-5}$ |
| Example 2 | Ce$_{0.83}$La$_{0.11}$Sr$_{0.06}$F$_{2.94}$ | 2.5 × 10$^{-5}$ | 1.5 × 10$^{-5}$ |
| Example 3 | Ce$_{0.78}$La$_{0.16}$Sr$_{0.06}$F$_{2.94}$ | 1.8 × 10$^{-5}$ | 1.5 × 10$^{-5}$ |

TABLE 2-continued

| | Composition | (Predicted value) Conductivity/ Scm$^{-1}$ | (Test result) Conductivity/ Scm$^{-1}$ |
|---|---|---|---|
| Example 4 | $Ce_{0.72}La_{0.22}Sr_{0.06}F_{2.94}$ | $1.8 \times 10^{-5}$ | $1.5 \times 10^{-5}$ |
| Example 5 | $Ce_{0.67}La_{0.27}Sr_{0.06}F_{2.94}$ | $1.5 \times 10^{-5}$ | $1.7 \times 10^{-5}$ |
| Example 6 | $Ce_{0.61}La_{0.33}Sr_{0.06}F_{2.94}$ | $2.0 \times 10^{-5}$ | $1.2 \times 10^{-5}$ |

As shown in Table 2, it was confirmed that the predicted values for Examples 1 to 6 were not largely separated from the test results.

REFERENCE SIGNS LIST 1 cathode layer
2 anode layer
3 solid electrolyte layer
4 cathode current collector
5 anode current collector
6 battery case
10 fluoride ion battery

What is claimed is:

1. A solid electrolyte to be used for a fluoride ion battery, the solid electrolyte comprising:
    a composition of $Ce_{1-x-y}La_xSr_yF_{3-y}$, in which $0<x$, $0<y$, and $0<x+y<1$; and
    a crystal phase that has a Tysonite structure.

2. The solid electrolyte according to claim 1, wherein the x satisfies $0.06 \leq x \leq 0.33$.

3. A fluoride ion battery comprising: a cathode layer, an anode layer, and a solid electrolyte layer formed between the cathode layer and the anode layer; wherein
    at least one of the cathode layer, the anode layer, and the solid electrolyte layer contains the solid electrolyte according to claim 1.

4. A fluoride ion battery comprising: a cathode layer, an anode layer, and a solid electrolyte layer formed between the cathode layer and the anode layer; wherein
    at least one of the cathode layer, the anode layer, and the solid electrolyte layer contains the solid electrolyte according to claim 2.

* * * * *